Figure 1:
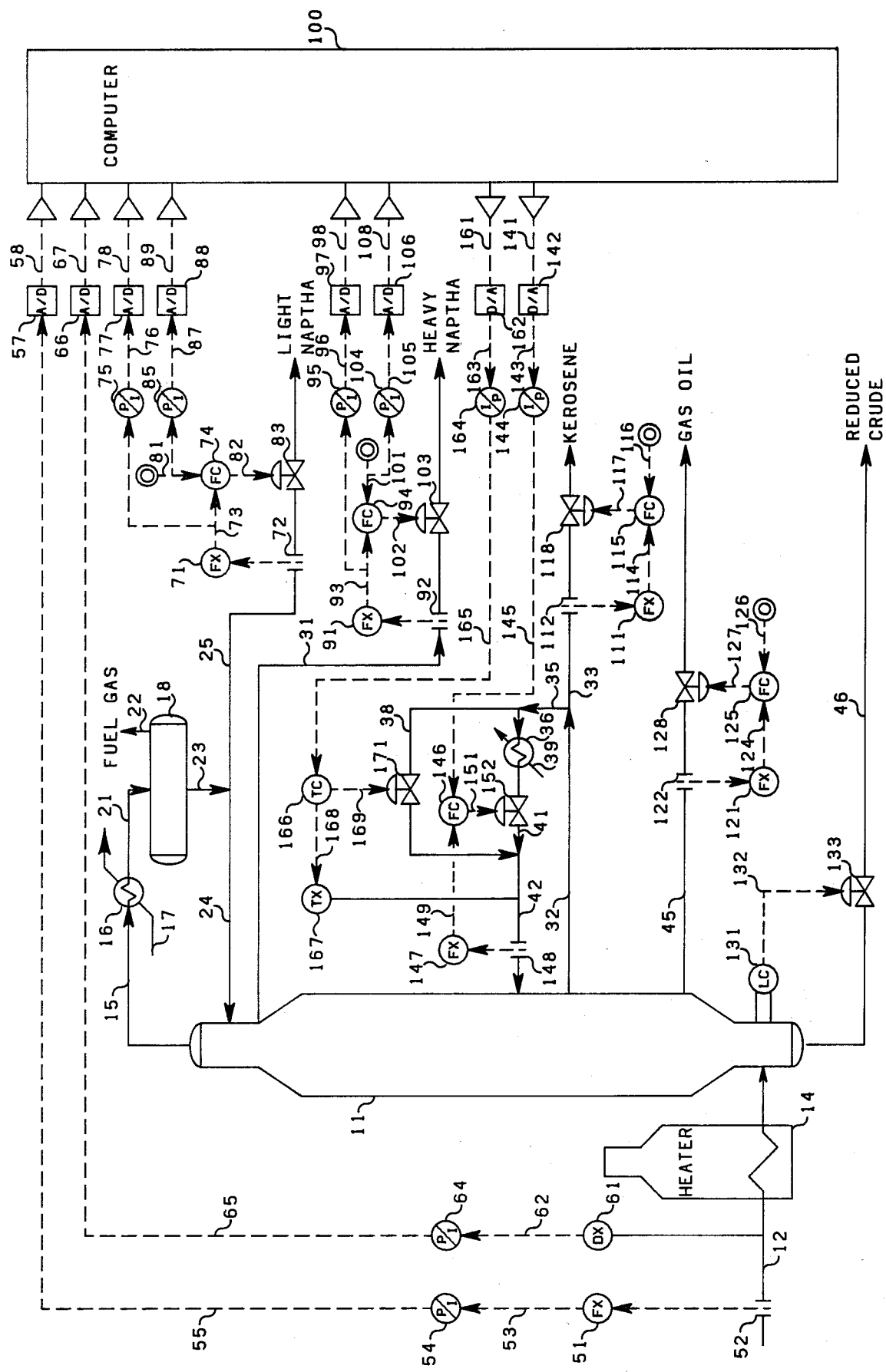

United States Patent [19]

Hofferber

[11] 4,289,588

[45] Sep. 15, 1981

[54] FRACTIONAL DISTILLATION COLUMN PUMPAROUND HEAT REMOVAL CONTROL

[75] Inventor: James A. Hofferber, Bartlesville, Okla.

[73] Assignee: Phillips Petroleum Company, Bartlesville, Okla.

[21] Appl. No.: 173,577

[22] Filed: Jul. 30, 1980

Related U.S. Application Data

[62] Division of Ser. No. 60,570, Jul. 25, 1979, Pat. No. 4,246,070.

[51] Int. Cl.³ .................................... B01D 3/42
[52] U.S. Cl. ........................... 203/2; 203/DIG. 18; 208/DIG. 1

[58] Field of Search ............... 196/132; 202/160, 206; 203/1, 3, 2, DIG. 18; 208/DIG. 1, 385; 364/501; 62/21, 37

[56] References Cited

U.S. PATENT DOCUMENTS 3,463,725 8/1969 MacFarlane et al. ...... 203/DIG. 18
3,985,623 10/1976 Morgan et al. ................. 196/132

Primary Examiner—Frank Sever

[57] ABSTRACT

A control system for a fractional distillation column in which a pumparound stream is used to remove heat from the fractional distillation column is disclosed. A combination of feedforward and feedback control is utilized to control the heat removal by the pumparound stream in such a manner that smoother operation of the fractional distillation column will be accomplished and a closer approach to required product specifications will be approached.

10 Claims, 2 Drawing Figures

FRACTIONAL DISTILLATION COLUMN PUMPAROUND HEAT REMOVAL CONTROL

This application is a division of my copending application Ser. No. 060,570 filed July 25, 1979, now U.S. Pat. No. 4,246,070.

This invention relates to fractional distillation. In one aspect this invention relates to method and apparatus for controlling heat removal from a fractional distillation column. In another aspect this invention relates to method and apparatus for providing both feedforward and feedback control of heat removal by a pumparound stream associated with a fractional distillation column.

Heat is commonly added to a fractional distillation column through a fired reboiler heater or by circulating a heated fluid through the lower portion of the fractional distillation column. Heat is commonly removed from the fractional distillation column by overhead condensers. In some fractional distillation columns, closer control of the heat removal from the fractional distillation column is accomplished by using a combination of overhead condensers and a pumparound stream which is withdrawn from the side of the fractional distillation column, circulated through a cooler, and returned as a center reflux to the fractional distillation column.

The amount of heat removed from the fractional distillation column directly determines the internal reflux flow rate. The internal reflux flow rate must be maintained at desired levels to obtain products which meet predetermined specifications. It is thus necessary to closely control the heat removal from the fractional distillation column if desired product specifications are to be obtained.

In the past, it has been common to use only a feedback control system for the pumparound stream. Commonly, the temperature of the pumparound stream is measured and compared to a desired temperature and the temperature of the pumparound stream is manipulated in response to the comparison. This feedback control provides good control of the heat removal from the fractional distillation column by means of the pumparound stream so long as process disturbances do not occur. However, if the flow rate of the feed to the fractional distillation column should change or the density of the feed flowing to the fractional distillation column should change, feedback control cannot react to these changes quickly enough to prevent off-specification product from being produced. Feedforward control is needed to account for process disturbances. It is thus an object of this invention to provide both feedforward and feedback control of heat removal by a pumparound stream associated with a fractional distillation column.

In accordance with the present invention, method and apparatus is provided whereby the flow rate of the feed to the fractional distillation column and the density of the feed flowing to the fractional distillation column are measured. The flow rate of the pumparound stream required to maintain a desired heat removal from the fractional distillation column, and thus maintain a desired internal reflux flow rate, is predicted based on the measured flow rate and measured density together with constants which are representative of the specific heat of the pumparound stream, the temperature of the pumparound stream flowing from the fractional distillation column, and the temperature of the pumparound stream returning to the fractional distillation column.

Feedback control is utilized to trim and correct any deficiencies in the feedforward control system caused by errors in the empirical feedforward model. The pumparound return temperature is manipulated in response to a comparison of the actual pumparound return temperature with the desired pumparound return temperature to provide feedback control for the heat removal by the pumparound stream.

The combination feedforward-feedback control for the heat removal by the pumparound stream provides stabilized fractional distillation column operation and reduces upsets for the fractional distillation column by intercepting disturbances and load changes caused by changes in the flow rate of the feed to the fractional distillation column or changes in the density of the feed flowing to the fractional distillation column. The feedforward, predictive control allows the control system to respond to process changes before those process changes affect the products flowing from the fractional distillation column. The feedback control makes adjustments to allow for deficiencies in the feedforward model. The combination of the feedforward-feedback control system thus provides improved control of the heat removal by the pumparound stream which results in a higher probability that product specifications will be met.

Figure 2:
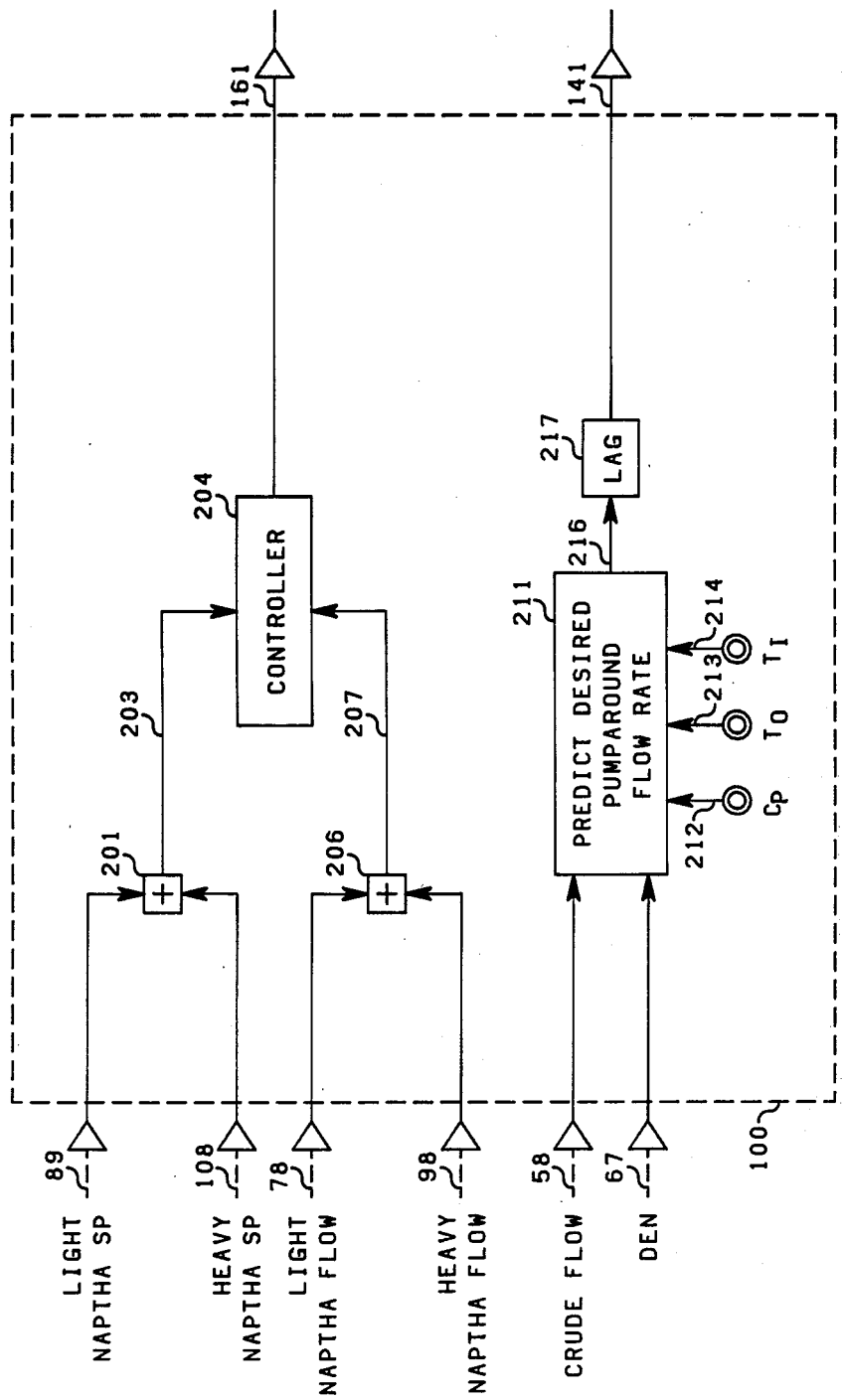

Other advantages of the invention will be apparent from the foregoing brief description of the invention and the claims as well as from the detailed description of the drawings in which:

FIG. 1 is an illustration of a fractional distillation column and the associated control system for the pumparound stream for the fractional distillation column; and FIG. 2 is a flow diagram of the computer logic required to generate the control signals utilized to control the heat removal by the pumparound stream associated with the fractional distillation column illustrated in FIG. 1.

The invention is illustrated and described in terms of a crude oil distillation column in which crude oil is fractionated. However, the invention is applicable to any fractional distillation column in which a pumparound stream is utilized to withdraw heat from the fractional distillation column.

The invention is also described in terms of a pumparound system in which kerosene is utilized. However, the invention is applicable to pumparound systems which utilize other produce streams flowing from a fractional distillation column.

Although the invention is illustrated and described in terms of a specific fractional distillation column and a specific control system for the pumparound stream associated with the fractional distillation column, the invention is also applicable to different types and configurations of fractional distillation columns as well as different types of control system configurations which accomplish the purpose of the invention. Lines designated as signal lines in the drawings are pneumatic or electrical in this preferred embodiment. However, the invention is also applicable to mechanical, hydraulic or other signal means for transmitting information. In almost all control systems some combination of these types of signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where
S=output control signal;
E=difference between two input signals; and
$K_1$ and $K_2$=constants.

The scaling of an output signal by a controller is well known in control systems art. Essentially, the output of a controller may be scaled to represent any desired factor or variable. An example of this is where a desired temperature and an actual temperature is compared by a controller. The output could be a signal representative of a desired change in the flow rate of some gas necessary to make the desired and actual temperatures equal. On the other hand, the same output signal could be scaled to represent a percentage or could be scaled to represent a pressure change required to make the desired and actual temperatures equal. If the controller output can range from 3 to 15 pounds, which is typical, then the output signal could be scaled so that an output signal having a pressure of 9 pounds corresponds to 50 percent, some specified flow rate, or some specified pressure.

The various transducing means used to measure parameters which characterize the process and the various signals generated thereby may take a variety of forms or formats. For example, the control elements of the system can be implemented using electrical analog, digital electronic, pneumatic, hydraulic, mechanical or other types of equipment or combinations of one or more of such equipment types. While the presently preferred embodiment of the invention preferably utilizes a combination of pneumatic control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings, and in particular FIG. 1, a fractional distillation column 11 is illustrated which is utilized to fractionate a crude oil feed into six separate products. These products are, in order of increasing gravity, overhead gases or fuel gas, light naphtha, heavy naphtha, kerosene, gas oil and reduced crude. The crude oil feed is supplied to the fractional distillation column 11 through conduit means 12. The crude oil feed is heated prior to introduction into the fractional distillation column 11 in the heater 14.

An overhead stream is provided from the fractional distillation column 11 through conduit means 15 to the heat exchanger 16. The heater exchanger 16 is provided with a cooling medium flowing to conduit means 17. The partially condensed fluid stream from the heat exchanger 16 is provided to the overhead accumulator 18 through conduit means 21. The portion of the fluid stream flowing through conduit means 21 which remains in vapor form in withdrawn from the overhead accumulator 18 through conduit means 22 as a fuel gas. The liquid portion of the fluid stream flowing through conduit means 21 is withdrawn from the accumulator 18 through conduit means 23. The fluid flowing through conduit means 23 is provided as an upper external reflux to the fractional distillation column 11 through the combination of conduit means 23 and conduit means 24. The fluid flowing through conduit means 23 is also provided as the light naphtha product from the fractional distillation column 11 by the combination of conduit means 23 and 25.

A heavy naphtha product stream is withdrawn from an upper portion of the fractional distillation column 11 through conduit means 31. Kerosene is withdrawn from a central portion of the fractional distillation column 11 through conduit means 32. The thus withdrawn kerosene is provided as a product from the fractional distillation column 11 through the combination of conduit means 32 and conduit means 33. At least a portion of the kerosene flowing through conduit means 32 is also recycled to the fractional distillation column 11. The recycled kerosene stream is referred to as the pumparound stream and is utilized to withdraw heat from the fractional distillation column 11. From the conduit means 32, the kerosene is provided through conduit means 35 to the heat exchanger 36. At least a portion of the kerosene flowing through conduit means 35 may be bypassed around the heat exchanger 36 through conduit means 38. The heat exchanger 36 is provided with a cooling medium flowing through conduit means 39. After passing through the heat exchanger 36, the kerosene flows through conduit means 41, is combined with the kerosene flowing through conduit means 38, and is returned to the fractional distillation column 11 through conduit means 42 as a center external reflux for the fractional distillation column 11.

Gas oil is withdrawn from a lower portion of the fractional distillation column 11 through conduit means 45. Reduced crude is withdrawn from the bottom portion of the fractional distillation column 11 through conduit means 46.

Control of the fractional distillation column 11, illustrated in FIG. 1, is generally accomplished by measuring a plurality of system parameters and either directly controlling the process based on these system parameters or supplying the measured parameters to computer means 100. Computer means 100 is also supplied with a plurality of set point signals which are generally representative of certain operating characteristics of the fractional distillation column 11 illustrated in FIG. 1. In response to the measured inputs and the set point inputs, computer means 100 calculates the required flow rate for the pumparound stream and also calculates the required temperature for the pumparound stream returning to the fractionalal distillation column 11.

Flow transducer 51, in combination with the flow sensor 52 which is operably located in conduit means 12, provides an output signal 53 which is representative of the flow rate of the feed flowing through conduit means 12. Signal 53 is provided from the flow transducer 51 to the pneumatic-to-current (P/I) transducer 54. Signal 53 is converted from pneumatic form to an electrical form by the P/I converter 54 and is provided as signal 55 to the analog-to-digital (A/D) converter 57. Signal 55 is converted from analog form to digital form and is provided as signal 58 to computer means 100.

The density meter and transducer 61 provides an output signal 62 which is representative of the density of the feed flowing through conduit means 12. Signal 62 is provided as an input to the P/I converter 64. Signal 62 is converted from pneumatic form to electrical form by the P/I converter 64 and is provided as signal 65 to the A/D converter 66. Signal 65 is converted from analog form to digital form by the A/D converter 66 and is provided as signal 67 to computer means 100.

Flow transducer 71, in combination with the flow sensor 72 which is operably located in conduit means 25, provides an output signal 73 which is representative of the flow rate of the light naphtha flowing through conduit means 25. Signal 73 is provided as an input to the flow controller 74 and is also provided as an input to the P/I converter 75. Signal 73 is converted from pneumatic form to electrical form by the P/I converter 75 and is provided as signal 76 to the A/D converter 77. Signal 76 is converted from analog form to digital form by the A/D converter 77 and is provided as signal 78 to computer means 100.

The flow controller 74 is also provided with a set point signal 81 which is representative of the desired flow rate of the light naphtha flowing through conduit means 25. In response to signal 73 and 81, the flow controller 74 provides an output signal 82 which is responsive to the difference between signals 73 and 81. Signal 82 is provided to the pneumatic control valve 83 which is operably located in conduit means 25. The pneumatic control valve 83 is manipulated in response to signal 82 to maintain a desired flow rate of the light naphtha flowing through conduit means 25.

The set point signal 81 is also provided as an input to the P/I converter 85. Signal 81 is converted from pneumatic form to electrical form by the P/I converter 85 and is provided as signal 87 to the A/D converter 88. Signal 87 is converted from analog form to digital form by the A/D converter 88 and is provided as signal 89 to computer means 100.

Flow transducer 91, in combination with the flow sensor 92 which is operably located in conduit means 31, provides an output signal 93 which is representative of the flow rate of the heavy naphtha flowing through conduit means 31. Signal 93 is provided as an input to the flow controller 94 and is also provided as an input to the P/I converter 95. Signal 93 is converted from pneumatic form to electrical form by the P/I converter 95 and is provided as signal 96 to the A/D converter 97. Signal 96 is converted from analog form to digital form by the A/D converter 97 and is provided as signal 98 to computer means 100.

The flow controller 94 is also provided with a set point signal 101 which is representative of the desired flow rate of the heavy naphtha flowing through conduit means 31. In response to signals 93 and 101, the flow controller 94 provides an output signal 102 which is responsive to the difference between signals 93 and 101. Signal 102 is provided from the flow controller 94 to the pneumatic control valve 103 which is operably located in conduit means 31. The pneumatic control valve 103 is manipulated in response to signal 102 to thereby maintain a desired flow rate of the heavy naphtha flowing through conduit means 31.

The set point signal 101 is also provided as an input to the P/I converter 104. Signal 101 is converted from pneumatic form to electrical form by the P/I converter 104 and is provided as signal 105 to the A/D converter 106. Signal 105 is converted from analog form to digital form by the A/D converter 106 and is provided as signal 108 to computer means 100.

Flow transducer 111, in combination with the flow sensor 112 which is operably located in conduit means 33, provides an output signal 114 which is representative of the flow rate of the kerosene flowing through conduit means 33. Signal 114 is provided as an input to the flow controller 115. The flow controller 115 is also provided with a set point signal 116 which is representative of the desired flow rate of the kerosene flowing through conduit means 33. In response to signals 114 and 116, the flow controller 115 provides an output signal 117 which is responsive to the difference between signals 114 and 116. Signal 117 is provided to the pneumatic control valve 118 which is operably located in conduit means 33. The pneumatic control valve 118 is manipulated in response to signal 117 to thereby maintain a desired flow rate of kerosene through conduit means 33.

Flow transducer 121 in combination with the flow sensor 122 which is operably located in conduit means 45 provides an output signal 124 which is representative of the flow rate of the gas oil flowing through conduit means 45. Signal 124 is provided as an input to the flow controller 125. The flow controller 125 is also provided with a set point signal 126 which is representative of the desired flow rate of the gas oil flowing through conduit means 45. In response to signals 124 and 126, the flow controller 125 provides an output signal 127 which is responsive to the difference between signals 124 and 126. Signal 127 is provided to the pneumatic control valve 128 which is operably located in conduit means 45. The pneumatic control valve 128 is manipulated in response to signal 127 to thereby maintain a desired flow rate of gas oil through conduit means 45.

The level controller 131 provides an output signal 132 which is representative of the position of the pneumatic control valve 133 which is required to maintain a desired flow rate of the reduced crude flowing through conduit means 46. The liquid level in the fractional distillation column 11 is controlled by manipulating the pneumatic control valve 133, which is operably located in conduit means 46, in response to signal 132.

In response to the described inputs, computer means 100 calculates two control signals which are utilized in controlling the pumparound stream associated with the fractional distillation column 11. A first signal calculated by computer means 100 is a prediction of the flow rate of kerosene flowing through conduit means 41 required to maintain a desired internal reflux flow rate for the fractional distillation column 11. Signal 141, which is representative of the predicted desired flow rate of the kerosene flowing through conduit means 41, is provided as an output from the computer means 100 to the digital-to-analog (D/A) converter 142. Signal 141 is converted from digital form to analog form by the D/A converter 142 and is provided as signal 143 to the current-to-pressure (I/P) converter 144. Signal 143 is converted from electrical form to pneumatic form by the I/P converter and is provided as signal 145 to the flow controller 146. Signal 145 may be considered the set point signal for the flow controller 146.

The flow transducer 147 in combination with the flow sensor 148 which is operably located in conduit means 42 provides an output signal 149 which is representative of the flow rate of the kerosene flowing through conduit means 42. Signal 149 is provided as an input to the flow controller 146. In response to signals 145 and 149, the flow controller 146 provides an output signal 151 which is responsive to the difference between signals 145 and 149. Signal 151 is provided from the flow controller 146 to the pneumatic control valve 152 which is operably located in conduit means 41. The pneumatic control valve 152 is manipulated in response to signal 151 to maintain a desired flow rate of kerosene through conduit means 42.

A second output provided from computer means 100 is signal 161 which is representative of the temperature of the kerosene flowing through conduit means 42 required to maintain a desired internal reflux flow rate for the fractional distillation column 11. Signal 161 is provided as an output from computer means 100 to the D/A converter 162. Signal 161 is converted from digital form to analog form and is provided as signal 163 to the I/P converter 164. Signal 163 is converted from electrical form to pneumatic form and is provided as signal 165 to the temperature controller 166.

The temperature transducer 167, in combination with a temperature sensing device such as a thermocouple which is operably located in conduit means 42, provides an output signal 168 which is representative of the temperature of the kerosene flowing through conduit means 42. Signal 168 is provided as a second input to the temperature controller 166. In response to signals 165 and 168, the temperature controller 166 provides an output signal 169 which is responsive to the difference between signals 165 and 168. Signal 169 is provided from the temperature controller 166 to the pneumatic control valve 171 which is operably located in conduit means 38. the pneumatic control valve 171 is manipulated in response to signal 169 to thereby control the amount of kerosene which is bypassed through conduit means 38 around the heat exchanger 36. The desired temperature of the kerosene flowing through conduit means 42 is thus maintained by manipulating the pneumatic control valve 171.

The logic flow diagram utilized to calculate the control signals 141 and 161 in response to the previously described input signals to computer means 100 is illustrated in FIG. 2. Referring now to FIG. 2, signal 89, which is representative of the set point for the flow rate of the light naphtha through conduit means 25, is provided as a first input to the summing block 201. Signal 108, which is representative of the set point for the flow rate of the heavy naphtha flowing through conduit means 31, is provided as a second input to the summing block 201. Signal 89 is summed with signal 108 to provide signal 203 which is representative of a combined set point. Signal 203 is provided from the summing block 201 to the controller 204 which is a digital implementation of a proportional-integral controller. Signal 203 is considered the set point for the controller 204.

Signal 78, which is representative of the actual flow rate of the light naphtha flowing through conduit means 25, is provided as a first input to the summing block 206. Signal 98, which is representative of the actual flwo rate of the heavy naphtha flowing through conduit means 31, is provided as a second input to the summing block 206. Signals 78 and 98 are summed to provide signal 207 which is representative of the combined flow rate of the light naphtha flowing through conduit means 25 and the heavy naphtha flowing through conduit means 31. Signal 207 is provided from the summing block 206 as the process variable input to the controller 204. In response to signals 203 and 207, the controller 204 provides the output signal 161 which is responsive to the difference between signals 203 and 207. Signal 161, which is scaled so as to be representative of the desired temperature of the kerosene flowing through conduit means 42 is utilized as has been previously described.

Signal 58, which is representative of the actual flow rate of the feed flowing through conduit means 12, is provided as an input to the predict desired pumparound flow rate block 211. Signal 67, which is representative of the density of the feed flowing through conduit means 12, is also provided as an input to the predict desired pumparound flow rate block 211. The predict desired pumparound flow rate block 211 is also provided with three set point signals 212–214. The set point signal 212 is representative of the specific heat of kerosene. The set point signal 213 is representative of the typical temperature of the kerosne flowing from the fractional distillation column through conduit means 32. The set point signal 214 is representative of the typical temperature of the kerosene flowing to the fractional distillation column 11 through conduit means 42.

Equation (I) is utilized to calculate the desired pumparound flow rate based on the described inputs to the predict desired pumparound flow rate block 211.

$$F_p = \frac{AF_F + BD_F + C}{C_p(T_o - T_l)} \quad (I)$$

where $F_F$ = flow rate of the feed flowing through conduit means 12 to the fractional distillation column 11;

$D_F$ = density of the feed flowing through conduit means 12 to the fractional distillation column 11;

$C_P$ = specific heat of kerosene;

$T_o$ = the temperature of the kerosene flowing out of the fractional distillation column 11 through conduit means 32;

$T_I$ = temperature of the kerosene flowing to the fractional distillation column 11 through conduit means 42; and A, B and C are constants.

$T_o$ and $T_I$ are constants reflecting the normal temperatures for the kerosene flowing through conduit means 32 and the kerosene flowing through conduit means 42. Constants are utilized rather than actual temperature measurements to decouple the temperature control loop from the flow control loop.

The constants A, B and C of equation (I) may be developed by obtaining data from the fractional distillation column 11 under different operating conditions. The feed flow rate and feed density is varied while the kerosene pumparound flow rate is adjusted as required to maintain the desired product specifications. Data thus obtained relates feed flow and feed density to the kerosene pumparound flow rate that is necessary for satisfactory operation of the fractional distillation column 11. A curve fit routine, such as a multivariable linear regression routine, is then utilized to obtain values for the constants A, B and C. These values are utilized in equation (I) to make the model represented by equation (I) fit the measured data.

Signal 216, which is representative of the predicted desired flow rate of the kerosene flowing through conduit means 42, is provided from the predict desired pumparound flow rate block 211 to the lag block 217. The lag block 217 is a delay representative of the time required for a change in the flow rate of the feed to the fractional distillation column 11 or a change in the density of the feed flowing to the fractional distillation column 11 to effect the kerosene product composition. The thus delayed, predicted desired flow rate of the kerosene flowing through conduit means 42 is provided as signal 141 from the lag block 217. Signal 141 is provided as an output from computer means 100 and is utilized as has been previously described.

Signal 141 is considered the feedforward portion of the control system of the present invention. Signal 161 is considered the feedback portion. Signal 161 is utilized to trim the feedforward control. Trimming is required because the model represented by equation (I) may not always be totally accurate. Inaccuracies in the model represented by equation (I) are corrected by the use of the feedback control which utilizes signal 161 as a set point to the temperature controller 166.

The invention has been described in terms of a preferred embodiment as illustrated in FIGS. 1 and 2. Specific components used in the practice of the invention as illustrated in FIG. 1 such as flow sensors 52, 72, 92, 148, 112 and 122; flow transducers 51, 71, 91, 147, 111, and 121; pressure-to-current transducers 64, 75, 85, 95, and 104; current-to-pressure tranducers 164 and 144; temperature transducer 167; temperature controller 166; flow controllers 74, 94, 115, 125 and 146; pneumatic control valves 83, 103, 171, 152, 118, 128 and 133; and level controller 131 are each well known, commercially available control components such as are described at length in Perry's *Chemical Engineers Handbook*, 4th Edition, Chapter 22, McGraw-Hill. Other components are as follows:

| | |
|---|---|
| A/D converters 57, 66, 77, 88, 97 and 106 | MM5357 8 bit A/D Converter National Semiconductor |
| Digital-to-analog converters 142 and 162 | AD559 8 bit D/A Converter Analog Devices |
| Density meter 61 | Dynatrol Density Meter Automation Product, Inc. |
| Computer means 100 | Optrol 3600 Applied Automation, Inc. |

For reasons of brevity, conventional auxiliary fractionation equipment such as pumps, heat exchangers, additional measurement-control devices, etc., have not been included in the above description as they play no part in the explanation of the invention.

While the invention has been described in terms of the presently preferred embodiment, reasonable variations and modifications are possible by those skilled in the art within the scope of the described invention and the appended claims. Variations such as using an analog computer to perform the required calculations is within the scope of the invention.

That which is claimed is:

1. A method for controlling the internal reflux flow rate in a fractional distillation column means comprising the steps of:

supplying a feed to said fractional distillation column means;

supplying heat to said fractional distillation column means;

withdrawing a sidedraw stream from an intermediate portion of said fractional distillation column means;

recycling at least a portion of said sidedraw stream to an intermediate portion of said fractional distillation column means as intermediate external reflux for said fractional distillation column means;

using at least computing means to establish a first signal representative of a prediction of the flow rate of said intermediate external reflux required to maintain a desired internal reflux flow rate in said fractional distillation column means;

establishing a second signal representative of the actual flow rate of said intermediate external reflux;

using computing means to compare said first signal and said second signal and establishing a third signal responsive to the difference between said first signal and said second signal; and manipulating the flow rate of said intermediate external reflux in response to said third signal to thereby maintain a desired internal reflux flow rate in said fractional distillation column means.

2. A method in accordance with claim 1 wherein said step of recycling at least a portion of said sidedraw stream to an intermediate portion of said fractional distillation column means as said intermediate external reflux for said fractional distillation column means comprises:

passing at least a portion of the recycled sidedraw stream through a cooling means;

bypassing at least a portion of the recycled sidedraw stream around said cooling means; and combining the portion of said sidedraw stream passed through said cooling means and the portion of said recycled sidedraw stream bypassed around said cooling means; and introducing the thus combined sidedraw stream into an intermediate portion of said fraction distillation column means as said intermediate external reflux for said fractional distillation column means.

3. A method in accordance with claim 2 additonally comprising the step of:

establishing a fourth signal representative of the desired temperature of said intermediate external reflux;

establishing a fifth signal representative of the actual temperature of said intermediate external reflux;

comparing said fourth signal and said fifth signal and establising a sixth signal responsive to the difference between said fourth signal and said fifth signal; and manipulating the amount of fluid bypassed around said cooling means in response to said sixth signal to thereby maintain said intermediate external reflux at said desired temperature.

4. A method in accordance with claim 3 wherein a first product having a sprecific gravity which is less than the specific gravity of the fluid which makes up said sidedraw stream is withdrawn from said fractional distillation column means.

5. A method in accordance with claim 4 wherein said step of establishing said first signal comprises:

establishing a seventh signal representative of the flow rate ($F_F$) of the feed flowing to said fractional distillation column;

establishing an eighth signal representative of the density ($D_D$) of the feed flowing to said fractional distillation column means;

establishing a ninth signal representative of the specific heat ($C_P$) of the fluid which makes up said sidedraw stream;

establishing a tenth signal representative of the typical temperature ($T_O$) of the sidedraw stream as the sidedraw stream is withdrawn from the fractional distillation column;

establishing an eleventh signal representative of the typical temperature ($T_I$) of said intermediate external reflux returning to said fractional distillation column means; and establishing said first signal in response to said seventh, eighth, ninth, tenth and eleventh signals.

6. A method in accordane with claim 5 wherein said step of establishing said first signal in response to said seventh, eighth, ninth, tenth and eleventh signals comprises:

multiplying said seventh signal by a constant (A) to establish a twelfth signal representative of $(A)(F_F)$;

multiplying said eighth signal by a constant (B) to establish a thirteenth signal representative of $(B)(D_F)$;

summing said twelfth signal and said thirteenth signal to produce a fourteenth signal representative of $(A)(F_F)+(B)(D_F)$;

adding a constant (C) to said fourteenth signal to establish a fifteenth signal representative of $(A)(F_F)+(B)(D_F)+C$;

subtracting said tenth signal from said eleventh signal to establish a sixteenth signal representative of $T_O-T_I$;

multiplying said sixteenth signal by said ninth signal to establish a seventeenth signal representative of $C_P(T_O-T_I)$;

dividing said fifteenth signal by said seventeenth signal to establish an eighteenth signal representative of $$\frac{(A)(F_F) + B(D_F) + C}{C_p(T_O - T_I)} ; \text{ and}$$

delaying said eighteenth signal, by the time period required for a change in the flow rate of the feed to said fractional distillation column means to effect the composition of said sidedraw stream, to establish said first signal.

7. A method in accordance with claim 6 wherein said constants A, B and C relate the flow rate of the feed to said fractional distillation column means and the density of the feed flowing to said fractional distillation column means to the flow rate of said intermediate external reflux required to maintain a desired internal reflux flow rate in said fractional distillation column means.

8. A method in accordance with claim 4 wherein said step of establishing said fourth signal comprises:

establishing a seventh signal representative of the desired flow rate of said first product;

establishing an eighth signal representative of the actual flow rate of said first product; and comparing said seventh signal and said eighth signal and establishing said fourth signal in response to the difference between said seventh signal and said eighth signal.

9. A method in accordance with claim 3 wherein said sidedraw stream is kerosene and a light naphtha product and heavy naphtha product are withdrawn from said fractional distillation column means.

10. A method in accordance with claim 9 wherein said step of establishing said fourth signal comprises:

establishing a seventh signal representative of the desired flow rate of said light naphtha;

establishing an eighth signal representative of the desired flow rate of said heavy naphtha;

summing said seventh signal and said eighth signal to establish a ninth signal representative of the combined desired flow rate of said light naphtha and said heavy naphtha;

establishing a tenth signal representative of the actual flow rate of said light naphtha;

establishing an eleventh signal representative of the actual flow rate of said heavy naphtha;

summing said tenth signal and said eleventh signal to produce a twelfth signal representative of the combined actual flow rate of said light naphtha and said heavy naphtha; and comparing said ninth signal and said twelfth signal and establishing said fourth signal responsive to the difference between said ninth signal and said twelfth signal.

* * * * *